United States Patent
Gordilov

(10) Patent No.: US 11,712,048 B2
(45) Date of Patent: *Aug. 1, 2023

(54) PROTEIN PRODUCT OBTAINED FROM BREWER'S GRAINS AND ITS PRODUCTION METHOD

(71) Applicant: BioBo GmbH, Bad Berneck (DE)

(72) Inventor: Oleg Grigorievich Gordilov, Rostov-na-Donu (RU)

(73) Assignee: BioBo GmbH, Bad Berneck (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/419,612

(22) PCT Filed: Apr. 13, 2020

(86) PCT No.: PCT/RU2020/000174
§ 371 (c)(1),
(2) Date: Jun. 29, 2021

(87) PCT Pub. No.: WO2021/201711
PCT Pub. Date: Oct. 7, 2021

(65) Prior Publication Data
US 2022/0039427 A1    Feb. 10, 2022

(30) Foreign Application Priority Data
Apr. 2, 2020   (RU) .................... 2020112828

(51) Int. Cl.
*A23J 1/12*     (2006.01)
*A23K 10/38*    (2016.01)
*A23J 3/14*     (2006.01)

(52) U.S. Cl.
CPC .............. *A23J 1/12* (2013.01); *A23J 3/14* (2013.01); *A23K 10/38* (2016.05)

(58) Field of Classification Search
CPC ...... A23K 10/38; A23K 50/10; A23K 20/147; A23J 1/12; A23J 1/005; A23J 3/14
(Continued)

(56) References Cited

U.S. PATENT DOCUMENTS

| | | | | | |
|---|---|---|---|---|---|
| 5,156,877 | A | * | 10/1992 | Kishi | ........................ A23J 1/12 426/624 |
| 5,702,748 | A | * | 12/1997 | Kishi | ........................ C12F 3/06 426/624 |

FOREIGN PATENT DOCUMENTS

| | | |
|---|---|---|
| CN | 1276980 A | 12/2000 |
| EP | 0694609 A2 | 1/1996 |

(Continued)

OTHER PUBLICATIONS

Ibbett et al. Innovative Food Science and Emerging Technologies 56 (2019) 102184, available online on Jun. 22, 2019. (Year: 2019).*

*Primary Examiner* — Subbalakshmi Prakash
(74) *Attorney, Agent, or Firm* — BCF LLP

(57) ABSTRACT

The present technology generally relates to food-processing industry, namely to a method of processing brewer's grains. The invention enables to increase the level of extracted food fractions of brewer's grains up to 90-95% and to increase protein content in barley protein concentrate up to 50-65% wt (dry solid). The method implies that brewer's grains are subject to loosening by means of a vibrating screen, grinding in a colloid mill with addition of water or centrate in the ratio from 0.5:1 to 1:1 to brewer's grains in order to produce a pasty homogeneous mass from brewer's grains; and then this mass is subject to processing by means of a screw extractor for its further grinding and division into 2 factions: suspension with the humidity level of 90-95%, and ground husk of brewer's grains with the humidity level of 60-75% suitable for its further industrial use. Then the suspension is supplied to mechanical filtration in order to remove the (Continued)

ground husk, pumped into the container and dried in order to obtain the humidity level of max. 7%.

10 Claims, 2 Drawing Sheets

(58) Field of Classification Search
USPC .......................................................... 426/656
See application file for complete search history.

(56) References Cited

FOREIGN PATENT DOCUMENTS

| | | |
|---|---|---|
| RU | 2215426 C2 | 11/2003 |
| RU | 2250045 C2 | 4/2005 |
| WO | 9822751 A1 | 5/1998 |
| WO | 2010053493 A1 | 5/2010 |
| WO | 2010117288 A1 | 10/2010 |
| WO | 2018050863 A1 | 3/2018 |
| WO | 2018136234 A1 | 7/2018 |

\* cited by examiner

A

B

C

PROTEIN PRODUCT OBTAINED FROM BREWER'S GRAINS AND ITS PRODUCTION METHOD

FIELD OF TECHNOLOGY

This group of inventions is referred to food-processing industry and is related to technologies of processing the brewing industry wastes, mainly a method of processing brewer's grains in order to get barley protein product in the form of powder (concentrate) that can be used in food stuff with health-promoting and dietary properties. In particular, protein derived from brewer's grains is of the most significant interest for use in bakery, pastry, sausage manufacturing, sports and dietary nutrition. Besides, the invention can be used as a feed supplement in livestock farming, as a soil fertilizer in agriculture, etc.

BACKGROUND OF THE INVENTION

After producing beer brewing companies have a lot of wastes in the form of brewer's grains consisting of remains of barley glume and grain particles rich in protein and fat. These brewer's (malt spent) grains raise the greatest interest among all secondary raw material resources of the brewing industry because they are produced in large quantities and they contain a lot of valuable nutritional ingredients.

Brewer's grains are obtained at the stage of filtering saccharified brewer's mash. Percentage composition of brewer's grains in the brewing industry wastes amounts to at least 98%. Brewer's grains consist of liquid and solid phases. The solid phase that accounts for approximately 45% in brewer's grains is represented by glume and grain kernel particles. In brewer's grains, there are fats, fibres and amino acids: histidine, lysine, leucine, isoleucine, methionine, valine, glycine, threonine, serine, alanine, arginine, phenylalanine, tyrosine, etc. Every year Russian brewing companies dispose more than 3.5 mln tons of brewer's grains—its protein content amounts to 25-28% which is almost 3 times higher than the protein amount in barley. Caloric density of wet grains amounts to 115 cal/g and of dry grains to 440 cal/g (with humidity of 7-10%). Ingredients in brewer's grains depend on the type of barley; technologies used for manufacturing brewer's malt; malt mix recipe for manufacturing beer; malt grout recipes for manufacturing beer, etc. However, the obtained quantitative composition of proteins, fats, hydrocarbons and fibres in brewer's grains varies slightly from 1 up to 5%.

At present, brewer's grains in the original form are not extensively used because transportation and storage processes are complicated—fermentation process starts in such brewer's grains at the temperature of 15-30° C. in 6-8 hours and the grains become unsuitable for processing and further use.

Prior art solutions comprise various methods of processing brewer's grains for their use as a feed supplement based on their preliminary drying with further granulation or grinding (for example, EP0694609A2; WO2010053493A1; WO2010117288A1; WO9822751A1, incorporated herein by reference). However, in the course of drying part of protein substances is transformed into a non-digestible form which causes decrease in nutritional value of dry brewer's grains in comparison with wet brewer's grains. Final protein content in dried brewer's grains reaches only 27-28%. Besides, this product contains significant amount (up to 80%) of non-digestible barley malt husk. Besides, drying of brewer's grains requires great power consumption so it is not always economically reasonable to make animal feed from such grains.

Known methods also include deeper processing of wastes from the brewing industry. In particular, there is a known method of processing liquid brewer's grains with the humidity level of 90-92% that envisages processing of raw materials using two-step compression method: to the humidity level of 70-75% during the first step and to the humidity level of 40-45% during the second step, and then two-stage drying: to the humidity level of 20-25% during the first stage and to the humidity level of 10% during the second stage with obtaining dry feed supplement (RU2215426, incorporated herein by reference). This method has a flaw: centrate containing a significant amount of nutrients is removed in the course of compression. Besides, the final product is also high in the amount of barley husk in the product.

Another known method suggests deriving a protein product from brewer's grains with the protein content from 60% to 90% (WO2018136234A1, incorporated herein by reference). This method implies thermochemical processing of brewer's grains when the following is done: a mixture of spent grains and water is added in a hydrolysis tank with constant stirring; then glucoamylase is added, then this obtained mixture is heated up to the temperature from 30 up to 70° C.; grain particles are subject to grinding in order to obtain the medium size of max. 500 micrometer; then the mixture pH is brought to the level approximately from 7 to 10.5 and then alkaline protease is added for the purpose of protein solubisation. The obtained mixture goes through the sieve with the holes' diameter from 5 to 500 micrometer; then ultrafiltration process takes place with the use of membranes with their pore size from 20 kDa to 40 kDa and then nanofiltration takes place. This method's flaw is a necessity of using sophisticated and expensive equipment, long technological cycle for obtaining the protein product (60-105 minutes, including 30-60 minutes for the grinding process and 30-45 minutes for hydrolysis) and the use of hazardous substances (hydrochloric or carboxylic acids and alkalis) in this technological process. Besides that this process requires great amounts of water use (from 8:1 to 11:1) and as a result a lot of centrate is formed. Such centrate is a waste product and additional equipment is required for its disposal.

Another technological solution (EP0694609A2, incorporated herein by reference) implies obtaining a protein composition from grain materials resulted from making beer. This composition contains from 40 to 60% of proteins, from 12 to 18% of lipids, from 2 to 6% of fibre materials and from 1 to 4% of ash in terms of the equivalent amount of dry weight. This method implies roller-grinding mill compression of brewer's grains with simultaneous wet peeling of grain particles and further separation of the obtained product from the husk. The method has a flaw: valuable components are removed from brewer's grains in the course of compression with roller grinding mills. Besides that brewer's grains are not subject to grinding before compression and a part of protein stays inside compressed husk particles therefore this protein is lost with the further husk removal. Besides, in order to enhance the husk removal efficiency, the obtained mixture (the liquid protein suspension) is rinsed with large quantities of water, then the obtained suspension is screened by means of screen plates. This rinsing and sieving process is repeated up to 5 times. As a result, great amount of centrate is produced. Such centrate is a waste product and additional purification equipment is required for its disposal.

Another known solution most similar to the present solution is biologically active powder made from brewer's grains and its production method that implies compression of wet brewer's grains and its division into solid and liquid fractions. In this case, the liquid fraction is subject to two-step compression and the solid fraction is sterilized and ground in order to obtain powder containing fat acids (RU2250045, incorporated herein by reference). However, powder with the humidity level of 10.8% obtained in this way is characterized with protein content of max. 30% wt. At the same time, amino acids content amounts to max. 25% wt, including essential amino acids that determine the protein's nutritional value of max. 10% wt.

Thus, existing methods of processing brewer's grains aimed at obtaining protein powder are characterized by complexity and duration of the protein production process, high output of centrate that is a waste product requiring additional equipment for its disposal.

Therefore, there is a necessity for creating methods of processing brewer's grains and obtaining the final product in the form of protein barley concentrate with protein content of at least 50% wt (dry solid) with the nutritional energy value of about 250±15 kcal with a simplified production method. At the same time, the amount of centrate being a waste product and subject to disposal is minimal because of its use in the technological cycle for making the initial raw materials wet.

DISCLOSURE OF THE INVENTION

The present technology is explained in greater detail below. This description is not intended to be a detailed catalogue of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure in which variations and additions do not depart from the present technology. Hence, the following description is intended to illustrate some particular embodiments of the technology, and not to exhaustively specify all permutations, combinations and variations thereof.

As used herein, the singular form "a," "an" and "the" include plural referents unless the context clearly dictates otherwise.

The recitation herein of numerical ranges by endpoints is intended to include all numbers subsumed within that range (e.g., a recitation of 1 to 5 includes 1, 1.25, 1.5, 1.75, 2, 2.45, 2.75, 3, 3.80, 4, 4.32, and 5).

The term "about" is used herein explicitly or not. Every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

As used herein, the expression "% wt" is calculated with respect to total dry solid weight. In some embodiments, the present technology relates to a barley protein concentrate obtained from brewer's grains, the protein concentrate having a humidity level equal to or less than 7%, particle size equal to or less than 0.1 mm and comprising proteins, fats, fibre and ash; wherein the protein content amounts of at least 50% wt.

In some embodiments the composition of such barley protein concentrate is optimal as it comprises the following ingredients in dry solid form: proteins in an amount of at least 50.0% wt; fats in an amount equal to or less than 12.0% wt; fibre in an amount equal to or less than 6.0% wt; ash in an amount equal to or less than 7.0% wt; and amino acids in an amount of at least 40.0% wt.

In some embodiments, the present technology relates to a method for obtaining barley protein concentrate (powder). The method comprises loosening-up the source brewer's grains in order to obtain a homogeneous mass; removing mechanical impurities from the homogeneous mass; humidifying of the homogeneous mass with subsequent while grinding and simultaneous homogenization in order to obtain a pasty mass (pulp) until the humidity level of less than or equal to 95%. After the ground husk is removed from the pulp suspension is obtained with a protein content of at least 50% dry wt.

In some instances, grinding is achieved by means of a colloid mill. Humidification is achieved by supplying water or centrate in the course of loading brewer's grains into the colloid mill.

In some embodiments, the steps of loosening-up the brewer's grains and removing mechanical impurities from the homogeneous mass are performed by means of a vibrating screen having an average hole size of between 6 mm and 10 mm and a screen vibration frequency of between 10 Hz and 50 Hz and an amplitude of between 2 mm and 20 mm.

In some embodiments, the step of grinding in the colloid mill is performed at a rate of mill's rotor rotation (rotor frequency) of between 1,800 rot./second and 3,200 rot./second in order to produce particles having an average particle size of between 0.10 mm and 0.9 mm. In the course of loading brewer's grains into the colloid mill water or centrate is supplied in order to provide for homogeneous humidifying of the raw materials in volume. After grinding the ground husk is removed by means of a screw extractor for example. Then suspension is subject to vibrating filtration with the use of screens (sieves) having an average hole size of between 0.2 mm and 0.6 mm for the purpose of removing remaining husk particles. Then the suspension is dried in a spray-type drier or in a vacuum-type drier until humidity reaches the level of equal to or less than 7%. In some implementations, drying in the spray-type drier is performed for a period of between about 8 hours and 10 hours at a temperature equal to or less than 200° C. The equipment processing capacity amounts to 20 litres per hour. As a result, concentrate with the particle size equal to or less than 0.1 mm (preferably equal to or less than 0.05 mm) is obtained. Drying in the vacuum-type drier is performed for a period of between about 8 hours and 10 hours at a temperature of equal to or less than 80° C. The equipment processing capacity amounts to 200 liters per a drying cycle. Therewith the suspension is subject to preliminary decanting until humidity reaches the level of equal to or less than 60%. After drying—a dry product in the form of granules having an average size of between 0.1 mm and 5 mm is obtained. In some further embodiments, the dry product is subject to grinding in order to obtain powder having an average particle size equal to or less than 0.1 mm.

In some embodiments, the produced barley protein concentrate is characterized with high protein content (of at least 50% wt, preferably 60-65% wt) which achieved by means of grinding brewer's grains with added water or centrate in the colloid mill, thorough separation of brewer's grain husk from the edible part in the screw separator with additional grinding of the processes mixture in the course of rubbing the mixture against the separator's filtering mesh with a screw. Besides that, centrate is not accumulated in the course of processing brewer's grains and obtaining the final product in the form of powder, because the produced centrate is recycled for humidifying the source raw materials and its quantity sent for disposal amounts to max. 1% from the manufacturing capacity of the brewer's grains processing line of about kg/l min.

BRIEF DESCRIPTION OF DRAWINGS

All features of embodiments which are described in this disclosure are not mutually exclusive and can be combined with one another. For example, elements of one embodiment can be utilized in the other embodiments without further mention. A detailed description of specific embodiments is provided herein below with reference to the accompanying drawings in which.

EMBODIMENT OF THE INVENTION

Below is a more detailed description of the claimed invention that does not limit the scope of the claimed invention but demonstrates implement ability of the invention by means of achieving the claimed technical result.

Figure 1:
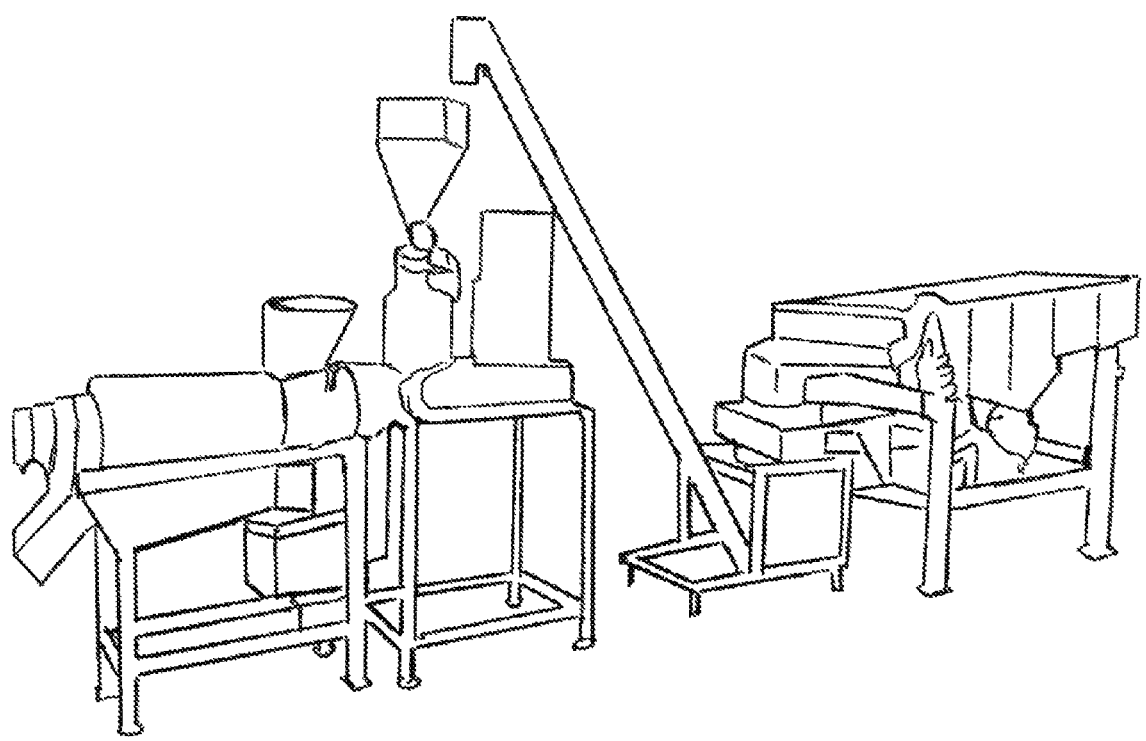
FIG. 1 is a schematic representation of a production line showing a part of the pilot production line comprising a vibrating screen, a conveyor, a colloid mill and a screw extractor for obtaining protein suspension from brewer's grains.
Figure 2:
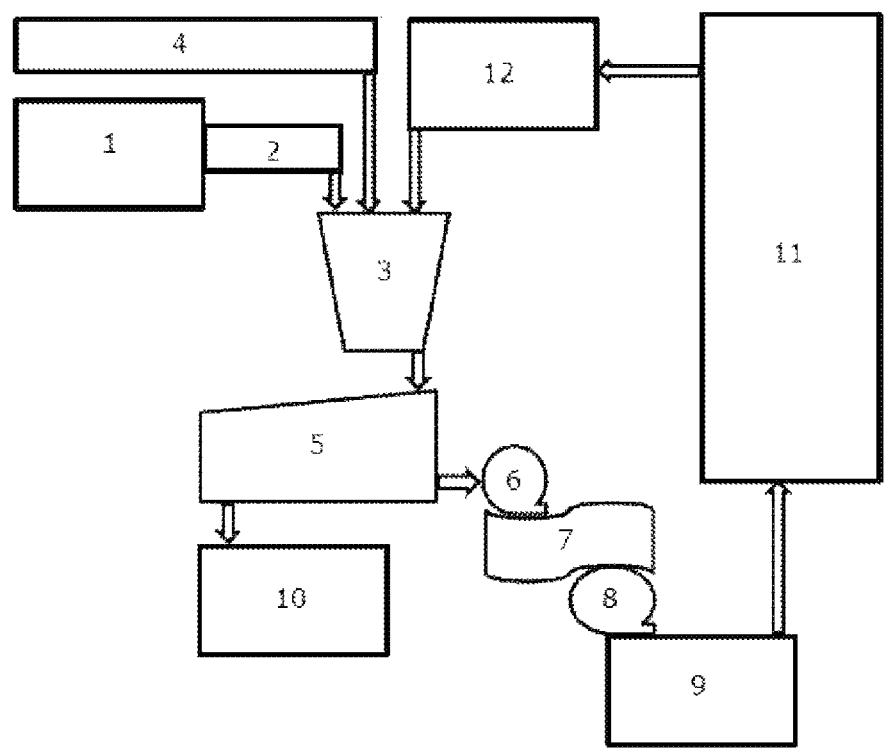
FIG. 2 is schematic representation of a production line for implementing a method according to one embodiment of the present technology, wherein: 1 indicates a vibrating screen, 2 indicates a conveyor, 3 indicates a colloid mill, 4 indicates a water pipeline, 5 indicates a screw extractor, 6 and 8 indicate impeller pumps, 7 indicates a vibration filter, 9 indicates a container (collection tank) for collecting the protein suspension, 10 indicates a container (collection tank) for collecting husk, 11 indicates a block for processing the protein suspension in order to produce protein concentrate, 12 indicates a tank for centrate.
Figure 3:
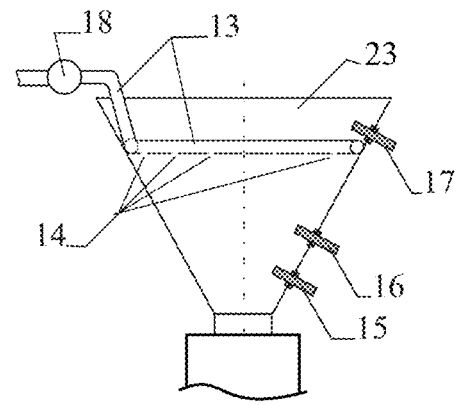
FIG. 3 is a schematic representation of a colloid mill's loading tank. A indicates a layout of constructive elements in the colloid mill's loading tank, B indicates an overhead view of the loading tank, C indicates a cross-section diagram of the colloid mill, wherein: 13 indicates a circular water pipeline, 14 indicates openings in the pipeline for water or centrate supply, 15, 16 and 17 indicate level-sensing devices, 18 indicates a control valve for water supply, 19 indicates a stator, 20 indicates a rotor, 21 indicates a stator shell, 22 indicates a rotor shaft and 23 indicates a loading tank of the colloid mill 3.
Figure 3:
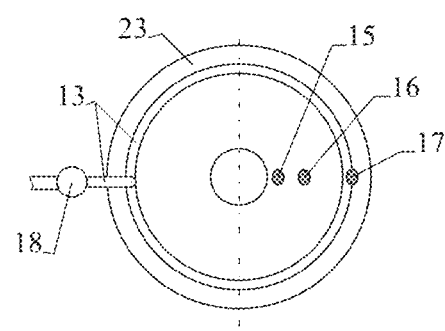
Figure 3:
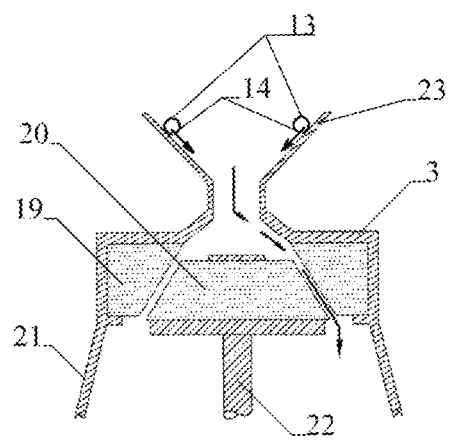

Initial brewer's grains with the humidity level of between about 70 and 90% are subject to processing in the course of 3 hours after they are produced (from the moment they are obtained as a waste product of the brewing industry). The temperature of such brewer's grains as soon as it arrives from the production facility varies from between about 2° C. and about 80° C. The brewer's grains are loaded manually or by means of any mechanical method on a vibrating screen 1 (FIG. 1, 2) with the hole size of between about 6 mm and about 10 mm equipped with a magnetic catcher where the brewer's grains are subject to loosening and removal of any mechanical and metallic foreign impurities. Processing by means of this vibrating screen implies sieving of the brewer's grains with a vibration frequency ranging from between about 10 Hz and about 50 Hz and an amplitude of between about 2 mm and about 20 mm within between about 2 seconds and about 10 seconds in order to produce raw material without lumps and of a homogeneous composition for the further processing stage when the material is subject to grinding. It is possible to obtain a homogeneous mass with removal of mechanical impurities in the course of loosening the brewer's grains not only by means of a vibrating screen but also by means of any prior art device or a set of devices performing the mentioned functions. For the purpose of grinding, the conveyor 2 takes the loosened brewer's grains to the colloid mill 3 (FIG. 3) or another grinding machine capable of producing particles having an average size of between about 0.005 mm and about 0.5 mm. At the same time, the raw material is loaded in the colloid mill's tank step-by-step and water is added in order to provide for homogeneous humidifying of the raw materials in volume that can be performed both in a continuous mode and in a pulsating mode. In some instances, the ratio of the supplied water to the brewer's grains in mass is from between about 0.5:1 an about 1:1. The amount and rate of water supply can be calculated in advance based on the measured initial humidity parameters of the brewer's grains delivered for processing taking into account humidity losses in the course of sieving the brewer's grains by means of the vibrating screen. The humidity level of the brewer's grains subject to treatment in the colloid mill shall preferably be within the range of between about 90% and about 95%. The colloid mill 3 performs its homogeneous mixing (and/or homogenization) in order to produce a homogeneous pasty mass (pulp) with viscosity of preferably between about 750 cPa·s and about 1,400 cPa·s that moves by gravity to the screw extractor 5 where the mass is subject to additional grinding and separation into suspension with a humidity level of between about 90% and about 95% and a viscosity of between about 1.5 cPa·s and about 3 cPa·s and husk with the particle size ranging from between about 0.01 mm and about 1.0 mm and the humidity level of between about 60% and about 75%. The temperature of the brewer's grains subject to processing in the colloid mill and screw extractor can vary from between about 2° C. and about 90° C. The brewer's grains can be supplied to the colloid mill by means of any device known in the art, for example by means of a screw conveyor, or a belt conveyor, or a drag conveyor.

Grinding of the brewer's grains in the colloid mill 3 takes place in the shell 21 between working surfaces of the rotor 20 and the stator 19, for example, in the course of rotation of the mill's rotor 20 at the rate of 1,800-3,200 rot./second what enables to produce thick, homogeneous, but sloppy consistency of the pulp for the maximum extraction of a nutritional fraction from the initial raw material at the screw extraction stage. It is preferable to use centrate produced in the course of the suspension's further processing (in case of its concentrating) in the colloid mill 3 instead of water as this may provide better extraction of the nutritional fractions remained in the centrate and may prevent disposal of the centrate before it is discharged to the sewerage system.

Water or centrate from blocks 5 or 12 is supplied to the V-shaped tank (receiving bunker) 23 of the colloid mill 3 via openings 14 of the water pipeline 13 located around the circumference of the tank in its upper part above the mark indicating the maximum tank load with raw materials. Amount of the supplied water or centrate can be regulated by means of the valve 18. In some instances, the openings 14 in the pipeline are uniformly spaced along its length in order to ensure the homogeneous humidifying (thinning) of the brewer's grains during the course of processing.

After grinding in the colloid mill 3 the pulp is treated in the screw extractor 5 with the screw rotation rate from 2 rot./minute up to 8 rot./minute to quickly (e.g., within 1-2 seconds) separate the food suspension from a waste product, barley's husk. To this end, the pasty mass (pulp) produced by the colloid mill 3 goes (fell by gravity) to the screw extractor 5 where it is separated from the husk in order to produce suspension having a humidity level equal to or less than 95%, and a waste product, barley's husk with a humidity level of between about 60% and about 75% and an average husk particle size of between about 1.0 mm and about 5.0 mm. After the treatment in the screw extractor 5, the suspension may contain between about 2% and about 5% of small husk particles having an average particle size ranging from between about 0.01 and about 1.0 mm. This suspension (with the impeller or another pump 6 designed for work with suspension with the impurity level of up to 5% represented by small fractions of max. 1.0 mm) goes to the next purification stage—vibration filter 7 with the filter holes of between about 0.2 mm and about 0.5 mm. That process practically guarantees complete removal of remaining husk in the suspension after the screw extraction stage. After the vibration filter 7 the suspension is pumped to the collection tank 9 by means of the impeller pump 8. The produced protein suspension can be the final product that can be used as a food or feed supplement and it can also be frozen for its further use. The produced protein suspension can be sent for its further processing treatment to the block 11 for the purpose of obtaining a protein product (concentrate) with the humidity level of equal to or less than 7%, with the particle size of equal to or less than 0.1 mm, preferably 0.05 mm and with protein content between about 50% wt and about 65% wt. For this purpose, the obtained suspension is dried in a spray-type drier in the course of 8-10 hours at the temperature of max. 200° C. or in a vacuum-type drier in the course of 8-10 hours at the temperature of 80° C. Therewith before vacuum drying the suspension undergoes decanting in order to obtain humidity level equal to or less than 60%. The obtained pasty mass is dried and the obtained dry product (protein concentrate) in the form of granules having an average particle size 0.1-5 mm is subject to additional grinding in order to produce particles with the diameter of equal to or less than 0.05 mm.

Husk is a waste product of the brewer's grains processing and in the course of the screw extractor's operation husk naturally falls in the collection bunker from where it is delivered to the collection tank 10 by means of a screw conveyor, or a spiral conveyor or any other conveyor. The described production line can be used for producing barley protein concentrate with protein content of less than 50% wt, for example 40, 42, 47 and 49% wt (with a lower energy value) in case of respective settings of devices. Such product can be used in fields where there are no requirements to achieving the greatest possible quantitative content of protein in a protein product, for example, when it is used as animal food stuff.

The examples below are presented to illustrate the practice of various embodiments of the present disclosure. They are not intended to limit or define the entire scope of this disclosure. The disclosure is not limited to the particular embodiments described and illustrated herein but includes all modifications and variations falling within the scope of the disclosure as defined in the appended embodiments.

Example 1. Production of Protein Barley Concentrate 260 kg of brewer's grains with the humidity level of 75.59% (original composition, energy value of 150 kcal) were manually loaded on the vibrating screen 1 represented by the vibrating table unit XFZ1020 with a single-level screen and 10 mm holes, with the table unit length of 2,000 mm, with the table unit width of 1,000 mm, with the vibration frequency of 20 Hz and the vibration amplitude of 8 mm. From the vibrating screen 1 the mass by means of the belt conveyor 2 was supplied to the colloid mill 3 represented by the unit KDDJ-1,5 with the power capacity of 11 kW, with the rotation rate of 2,200 rot./minute of the rotor 20 that can also be equipped with a device for supplying drinking water from the block 4. In the colloid mill, the brewer's grains were humidified by means of water with the design amount of 170 litres (0.67:1) that was supplied to the colloid mill at the rate of 15 litres per minute. At the same time, the humidified brewer's grains were grinded in order to obtain a faction of 0.1-0.9 mm. The process of supplying the source raw materials and water to the loading tank 23 of the colloid mill 3 was controlled by means of three level-sensing devices 15, 16 and 17 built in the shell, of the loading tank 23 and a microcontroller located close to the level-sensing devices at the frame of the table on which the colloid mill is installed. At the same time, one of the level-sensing device, the upper one, 17 was used for controlling the maximum possible load of the raw material in the bunker (85-90% in volume of the maximum capacity of the bunker); when this level was reached a command to stop the loading conveyor was given; the second level-sensing device, the middle one, 16 was used for controlling the minimum level of the loaded raw material (25-30% in volume of the maximum capacity of the bunker); when this level was reached a command to start the loading conveyor and to supply the raw material was given what provided for continuous operation of the colloid mill. The third level-sensing device, the lower one, 15 was installed near the loading bunker's bottom at the distance of 15 cm from the bottom and it was used for controlling the minimum possible load of the raw material in the bunker (10-15% in volume of the maximum capacity of the bunker); if this level was not reached the colloid mill stopped until another portion of the raw material was supplied. After the colloid mill the produced pulp with viscosity of 900-1,200 cPa and the humidity level of 95% was delivered to the screw extractor 5 represented by the machine of KDLZ-1,5 model with the power capacity of 4 kW, with the rotation rate of 4.5-10 rot./minute. The output was suspension with the humidity level of 95% and viscosity of 2.013 cPa, and a waste product, barley's husk with the humidity level of 70.84%. By means of the impeller pump 6 with the power capacity of 0.25 kW with the rotation rate of 1,200 rot./minute the obtained suspension was delivered to the vibration filter 7 of XZS-1200-1S model with the power capacity of 0.75 kW with 0.3 mm openings. After filtration by means of the impeller pump 8 with the power capacity of 0.25 kW with the rotation rate of 1,200 rot./minute the food suspension was pumped to the collection tank 9. The husk naturally fell in the collection tank 10. Thus, suspension with the humidity level of 93%, with viscosity of 1.907 cPa and the particle size of 0.005-0.3 mm was produced. Then it was dried in the model spray-type drier HT-RY1500 during 8 hours at the temperature of 200° C. until humidity reached the level of 5% (capacity of this spray-type drier HT-RY1500 amounts to 1,500 ml of suspension per hour). 20.8 kg of barley protein concentrate was obtained. The concentrate (sample 1) is characterized by nutritional energy value of 255 kcal and the following composition, % wt (dry solid) (Table 1):

TABLE 1

| Composition | Brewer's grains (original composition), % wt | Food suspension, % wt (sample 1) |
|---|---|---|
| Protein | 18.98 | 61.17 |
| Fats | 7.9 | 11.9 |
| Fibre | 13.6 | 5.7 |
| Ash | 2.2 | 6.8 |
| at the same time protein from brewer's gains is rich in the following amino acids: | | |
| Arginine | 1.07 | 4.5 |
| Lysine | 0.86 | 2.97 |
| Tyrosine | 0.61 | 2.75 |
| Phenylalanine | 1.23 | 4.0 |
| Histidine | 0.66 | 2.8 |
| Isoleucine | 0.79 | 4.1 |
| Leucine | 0.57 | 1.73 |
| Methionine | 0.5 | 1.95 |
| Valine | 1.06 | 3.5 |
| Proline | 2.05 | 5.17 |
| Threonine | 0.77 | 2.26 |
| Serine | 0.89 | 2.56 |
| Alanine | 0.94 | 2.95 |
| Glycine | 0.79 | 2.3 |
| Cystine | 0.46 | 1.97 |
| Glutamic acid | 4.57 | 12.32 |
| Asparaginic acid | 1.35 | 2.06 |
| Total amount of amino acids | 19.17 | 59.89 |

The total time for processing 260 kg of brewer's grains amounted to 25 minutes.

Example 2. Production of Protein Barley Concentrate 200 kg of brewer's grains with the humidity level of 85.0% (original composition, energy value of 150 kcal) was processed and the suspension was obtained in the same way as in example 1. Thus, the suspension with the humidity level of 92%, with viscosity of 1.907 cPa and the particle size of 0.005-0.5 mm was produced. By means of a food centrifugal pump the suspension was supplied to the separating decanter LW220 at the rate of 100 liters per hour where it was processed until humidity reached the level of 60%. Then the pasty mass was dried in the model vacuum-type drier GRT-ZBG500 in the course of 8 hours at the temperature of 80° C. until humidity reached the level of 6.5% (the processing capacity of the vacuum-type drier amounts to 200 liters of water per a drying cycle that lasts 8-10 hours). Then the obtained dry product (0.1-5 mm granules) was subject to additional grinding in order to obtain particles with the diameter of 0.005-0.09 mm (disk mill VLM-80 with the grinding capacity of 80 kg/hour). 16.0 kg of barley protein concentrate was obtained. The concentrate (sample 2) is characterized by nutritional energy value of 245 kcal and the following composition, % wt (dry solid) (Table 2):

TABLE 2

| Composition | Brewer's grains (original composition), % wt | Food suspension, % wt (sample 2) |
|---|---|---|
| Protein | 18.98 | 51.16 |
| Fats | 7.9 | 10.8 |
| Fibre | 13.6 | 5.7 |
| Ash | 2.2 | 6.56 |
| at the same time protein from brewer's gains is rich in the following amino acids: | | |
| Arginine | 1.07 | 4.27 |
| Lysine | 0.86 | 2.37 |
| Tyrosine | 0.61 | 2.55 |
| Phenylalanine | 1.23 | 3.57 |
| Histidine | 0.66 | 1.8 |
| Isoleucine | 0.79 | 1.7 |
| Leucine | 0.57 | 2.1 |
| Methionine | 0.5 | 1.5 |
| Valine | 1.06 | 2.62 |
| Proline | 2.05 | 4.21 |
| Threonine | 0.77 | 2.26 |
| Serine | 0.89 | 1.79 |
| Alanine | 0.94 | 3.6 |
| Glycine | 0.79 | 2.19 |
| Cystine | 0.46 | 1.91 |
| Glutamic acid | 4.57 | 8.63 |
| Asparaginic acid | 1.35 | 2.06 |
| Total amount of amino acids | 19.17 | 49.13 |

The total time for processing 260 kg of brewer's grains amounted to 8 hours and 35 minutes (the processing was performed in a semi-industrial manner).

Thus, barley protein product (concentrate) produced had a high protein content with preservation of the amino acid composition of brewer's grains and low content of fats and fibres. The time from loading raw material to obtaining the final product in the form of powder, for example when calculated for 100 kg of brewer's grains took between about 5 and 10 minutes with the equipment's capacity from 20 to 500 tonnes/day. At the same time, the amount of centrate being a waste product and subject to disposal was minimal and it was equal to max. 1% of the capacity of the brewer's grain processing line of kg/1 minute.

Brewer's grains delivered from five different manufacturing facilities (sample) were processed by the described production line in accordance with the method of the present technology. The quantitative content of ingredients in the brewer's grains compositions was different from the original composition specified in table 1-2 within the limit of 1-5%. Table 3 shows compositions of barley protein concentrate with the optimal content of key components.

TABLE 3

| | of barley protein concentrate | | | | |
|---|---|---|---|---|---|
| Parameters | sample 2 | sample 3 | sample 4 | sample 5 | sample 6 |
| nutritional energy value (dry solid) | 245 kcal | 260 kcal | 258 kcal | 255 kcal | 265 kcal |

TABLE 3-continued

| | of barley protein concentrate | | | | |
|---|---|---|---|---|---|
| Parameters | sample 2 | sample 3 | sample 4 | sample 5 | sample 6 |
| humidity | 6.5% | 3.8% | 5.7% | 4.3% | 6.2% |
| particle size | 0.01-0.1 mm | 0.01-0.09 mm | 0.005-0.04 mm | 0.005-0.03 mm | 0.005-0.01 mm |
| Composition | | | content (% wt) | | |
| Protein | 51.1 | 62.19 | 58.3 | 55.4 | 64.7 |
| Fats | 10.7 | 11.9 | 10.9 | 11.2 | 11.8 |
| Fibre | 5.4 | 4.8 | 5.2 | 3.7 | 5.8 |
| Ash | 6.4 | 5.82 | 6.3 | 4.7 | 6.7 |
| | | Amino acid composition: | | | |
| Arginine | 3.93 | 4.27 | 4.6 | 4.0 | 5.3 |
| Lysine | 1.95 | 3 | 2.72 | 2.87 | 3.17 |
| Tyrosine | 2.15 | 3.85 | 2.53 | 2.23 | 3.72 |
| Phenylalanine | 3.5 | 4.97 | 4.47 | 3.68 | 4.17 |
| Histidine | 2.1 | 2.9 | 2.1 | 1.85 | 2.1 |
| Isoleucine/Leucine | 2.23 | 3.79 | 2.05 | 2.89 | 3.82 |
| Methionine | 2.43 | 2.55 | 2.1 | 1.97 | 2.1 |
| Valine | 2.84 | 2.62 | 2.9 | 2.75 | 3.16 |
| Proline | 3.85 | 4.73 | 4.1 | 3.95 | 5.1 |
| Threonine | 1.79 | 3.12 | 3.7 | 3.17 | 3.7 |
| Serine | 1.98 | 2.3 | 2.4 | 1.95 | 2.4 |
| Alanine | 2.84 | 4.1 | 4.3 | 3.97 | 4.3 |
| Glycine | 2.98 | 2.49 | 3.1 | 2.94 | 3.1 |
| Cystine | 2.62 | 2.1 | 2.4 | 1.95 | 2.4 |
| Glutamic acid | 7.7 | 9.8 | 8.5 | 7.94 | 10.3 |
| Asparaginic acid | 2.35 | 3.2 | 2.6 | 2.27 | 3.4 |
| Total amount of amino acids | 47.24 | 59.79 | 54.57 | 50.38 | 62.24 |

Table 4 includes parameters of processing brewer's grains (samples 3-7).

TABLE 4

| | Processing parameters | | | | |
|---|---|---|---|---|---|
| Equipment | sample 3 | sample 4 | sample 5 | sample 6 | sample 7 |
| Colloid mill/rotor rotation rate (rot./second) | 1,800 | 3,000 | 2,500 | 2,000 | 3,200 |
| Vibrating screen screen hole size (mm)/ vibration frequency (Hz and mm) | 10/10, 15 | 5/40, 10 | 7/30, 20 | 8/20, 15 | 6/50, 8 |
| Screw extractor/rotation rate (rot./second) | 3 | 8 | 5 | 7 | 10 |
| Filtration/hole size (mm) | 0.6 | 0.3 | 0.4 | 0.5 | 0.2 |
| Spray drying (time, temperature) | — | 8 hours 200° C. | 10 hours 150° C. | — | 9 hours 180° C. |
| Vacuum drying (time, temperature) | 8 hours 80° C. | — | — | 10 hours 60° C. | — |

Based on the above-given data it can be concluded that barley protein concentrate with high protein content is produced despite the fact that various plants use different types of barley, have various technologies for manufacturing brewer's malt, various malt mix recipes for manufacturing beer, etc. The two-stage processing of brewer's grains (in the colloid mill and in the screw extractor) without using multi-step compression processes and thermochemical treatment enables to obtain a high-protein product with protein content of min. 50.0% wt (dry solid) and without gluten.

This method enables to preserve all valuable biologically active components of the source brewer's grains. The rich chemical composition of brewer's grains with the minimal content of hydrocarbons predetermines its prospect in the food-processing industry, in particular its use as an albuminous vitamin-mineral additive in manufacturing of pastry products.

What is claimed is:
1. A method for producing a protein concentrate having a moisture content equal to or less than 7%, and comprising proteins, fats, fibre and ash; wherein the protein concentrate has a protein content of at least 55% wt with preservation of biological activity, the method comprising:
  i) loosening-up brewer's grains to obtain a homogeneous mass;
  ii) removing mechanical impurities from the homogeneous mass;

iii) subjecting the homogeneous mass to grinding, by a colloid mill, with addition of water or centrate to produce a pasty mass having: a moisture content of between 90 and 95%, and a particle size of between 0.1 mm and 0.9 mm, and wherein:
the addition of the water or the centrate is for homogeneous humidification of the pasty mass in a volume;
the pasty mass has a viscosity of between 750 cPa·s and 1400 cPa·s that moves by gravity to a screw extractor where the pasty mass is subject to additional grinding and separation to produce a suspension with a viscosity of between 1.5 and 3 cPa·s;
iv) subjecting the suspension of step iii) to vibrating filtration and drying to obtain the protein concentrate having the moisture content equal to or less than 7% and the protein content of at least 55% wt.

2. The method of claim 1, wherein a rotor speed of the colloid mill is between 1,800 rot./second and 3,200 rot./second.

3. The method of claim 2, wherein the water or centrate is supplied to a receiving bunker of the colloid mill via openings of a water pipeline located around a circumference of the receiving bunker in its upper part.

4. The method of claim 1, wherein step i) and step ii) are performed by means of a vibrating screen having an average hole size of between 6 mm and 10 mm, and a screen vibration frequency of between 10 Hz and 50 Hz and an amplitude of between 2 mm and 20 mm.

5. The method of claim 1, wherein the vibrating filtration is performed with screens having an average hole size of between 0.2 mm and 0.6 mm to remove remaining husk particles.

6. The method of claim 1, wherein the drying is performed in a spray-type drier or in a vacuum-type drier.

7. The method of claim 6, wherein the drying in the spray-type drier is performed for a period of between about 8 hours and 10 hours at a temperature equal to or less than 200° C.

8. The method of claim 6, wherein the drying in the vacuum-type drier is performed for a period of between 8 hours and 10 hours at a temperature equal to or less than 80° C.

9. The method of claim 8, further comprising grinding the dried protein concentrate to obtain a powder having an average particle size equal to or less than 0.1 mm, wherein, before drying in the vacuum-type drier, the suspension is subjected to decanting to achieve a moisture content equal to or less than 60%.

10. The method of claim 3, wherein openings in the water pipeline are uniformly spaced along its length in order to ensure the homogeneous humidifying of the pasty mass.

* * * * *